United States Patent
Adams et al.

(10) Patent No.: US 6,442,148 B1
(45) Date of Patent: Aug. 27, 2002

(54) RECONFIGURABLE MULTIBEAM COMMUNICATIONS SATELLITE HAVING FREQUENCY CHANNELIZATION

(75) Inventors: Gerald J. Adams, Rancho Palos Verdes, CA (US); Paul D. Tarbuck, Hawthorne, CA (US); Robert E. Vaughan, Redondo Beach, CA (US); Shih-Chang Wu, Alhambra, CA (US); Thomas S. La France, Manhattan Beach, CA (US); Sudhakar K. Rao, Torrance, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/222,200

(22) Filed: Dec. 23, 1998

(51) Int. Cl.$^7$ .............................. H04B 7/19; H04Q 7/28

(52) U.S. Cl. ...................... 370/325; 370/330; 342/356; 342/368; 445/12.1; 445/427

(58) Field of Search ................................ 370/323, 325, 370/316, 319, 334, 335, 344, 330; 342/356, 373, 352, 368; 455/12.1, 13.1, 13.3, 17, 18, 20, 22, 427, 428

(56) References Cited

U.S. PATENT DOCUMENTS

| | | | | |
|---|---|---|---|---|
| 4,858,225 A | * | 8/1989 | DeSantis ..................... | 370/325 |
| 4,931,802 A | * | 6/1990 | Assal et al. .................. | 342/356 |
| 5,924,031 A | * | 7/1999 | Copeland et al. .......... | 455/12.1 |
| 6,229,986 B1 | * | 5/2001 | Wu et al. .................... | 370/316 |
| 6,272,317 B1 | * | 8/2001 | Houston et al. ............ | 455/12.1 |

FOREIGN PATENT DOCUMENTS

EP 0 798 209 A2 10/1998

OTHER PUBLICATIONS

"In–orbit reconfigurable communications–satellite antennas," J.F. Balcewicz, RCA Engineer 28–2, Mar./Apr. 1983, pp. 36–41.

"The L–Band Land Mobile Payload (LLM) Aboard Artemis," L. Miracapillo et al, *American Institute of Aeronautics and Astronautics*, 96–1086–CP, pp. 879–887.

"Reconfigurable satellite antennas: a review," F. Rispoli, *Microwave and RF Engineering*, Apr. 1989, pp. S22–S27.

(List continued on next page.)

*Primary Examiner*—Alpus H. Hsu
*Assistant Examiner*—Afsar M. Qureshi
(74) *Attorney, Agent, or Firm*—DiPinto & Shimokaji, P.C.

(57) ABSTRACT

A satellite subsystem for a satellite employs a reconfigurable communications payload and active array antennas. The subsystem includes an active receive array antenna having a reconfigurable beam forming network for forming input beam signals from input signals received by the receive antenna from sources. An input switch matrix power divides the input beam signals into sets of input beam signals. Each of the channel signals corresponds to a respective channel of the input beam signals. The subsystem further includes a channelizer having a plurality of channel processors each receiving at least one input beam signal from the input switch matrix. The channel processors filter the input beam signals into channel signals. Each of the channel signals corresponds to a respective channel of the input beam signals. The channel processors change the frequency of at least one channel signal to route the at least one channel signal to a different channel than the respective channel of the input beam signals. An output switch matrix combines the channel signals into output beam signals. Each of the channel signals corresponds to a respective channel of the output beam signals. An active transmit array antenna having a reconfigurable beam forming network forms output signals from the output beam signals for transmission by the transmit array antenna to destinations.

16 Claims, 3 Drawing Sheets

OTHER PUBLICATIONS

"Recent Developments in Reconfigurable Reflectors," P.J.B. Clarricoats et al, *IEEE*, 90C112776–3XXX–1864 S1.(x) 1990, pp. 1864–1867.

"A Novel Semi–Active Multibeam Antenna Concept." A. Roederer et al, *IEEE*, 90C112776–3XXX–1884 (x), 1990, pp. 1884–1887.

"Inmarsat's Third Generation Space Segment," A. Howell et al, *American Institute of Aeronautics and Astronautics, Inc.*, 92–1815–CP, pp. 92–99.

"Active Ku–Band Spaceborne Antennas: Design, Technology and Testing," D. Michel et al, Alcatel Telecom, pp. 341–347.

"Active Antennas for Multiple–Beam Communications Satellites: Status and Review," A.I. Zaghloul et al, COMSAT Labs, Clarksburg, MD 20871, pp. 319–338.

"A Design Method of a Reconfigurable Direct Radiating Array Antenna," T. Morooka et al, *IEICE Trans. Commun.*, vol. E77–B, No. 5, May 1994, pp. 663–672.

"Resolution Performance of Adaptive Multiple Beam Antennas," K.M. SooHoo et al, Electronics Research Laboratory, The Aerospace Corporation.

"Reconfigurable Dual Feed Antenna for Direct Broadcast Satellites," N. Sultan et al, pp. 27–35.

"The IRIDIUM ® Main Mission Antenna Concept," J.J. Schuss et al, *IEEE* 0–7803–3232–6/96, pp. 411–415.

"Anaren Low Cost, Lightweight Antenna Beamforming Networks," An Anaren Technical Publication M 1090–49, Aug. 11, 1994, pp. 1–12.

"Multiple–Beam Antennas for Military Satellite Communications," J.J. Tavormina, *MSN& CT*, Oct. 1988, pp. 20–24.

"Building on a Powerful Thought," Electromagnetic Sciences, Inc., *MSN& CT*, Oct. 1988, pp. 2930.

"The Eutelsat II reconfigurable multibeam antennas: development review," G. Duret et al, *Ann. Telecommun.*, 44, No. 9–10, 1989, pp. 501–513.

* cited by examiner

RECONFIGURABLE MULTIBEAM COMMUNICATIONS SATELLITE HAVING FREQUENCY CHANNELIZATION

TECHNICAL FIELD

The present invention relates to multibeam satellites and, more particularly, to multibeam satellites having reconfigurable beam coverage and frequency channelization.

BACKGROUND ART

Communication satellites in geosynchronous orbit generally function as a simple repeater operating in bent-pipe mode. The only signal processing is a frequency translation between the uplink and the downlink channels, with the signal modulation remaining unchanged. In order to provide a high degree of capacity and to serve a diverse set of users, multiple transmit and/or receive beams are often employed.

In these multibeam satellites, incoming beams carry individual modulated carriers that may be switched among several downlink beams. A typical communications satellite includes an input demultiplexer that separates signals into one or more specific frequency bands to be amplified for retransmission to the ground in each of a number of individual transponders. The routing of signals within the satellite payload is generally unique for each payload design and is not able to be changed except for specific switching options that are included in the initial design of the unique payload. Furthermore, the specific frequency plan typically depends on the geosynchronous orbit location of the satellite due to the assignment of different frequencies according to ITU (International Telecommunications Union) standards.

With the expanding applications of satellites for many different aspects of communications, market requirements are continuously changing. As a result, a fixed payload configuration may not be able to meet coverage or channelization requirements that differ significantly from the original design. Accordingly, it would be highly desirable for a multibeam satellite to be capable of varying the frequency channel plan in which the number of channels, the channel bandwidth, the channel center frequency, and the channel loading are fully reconfigurable.

Because of the continuously changing market requirements, a multibeam satellite must also be capable of adapting to changes in the location of the requests for service. Thus, antennas on multibeam satellites must also be capable of reconfigurable beam coverages.

A multibeam satellite having a reconfigurable multibeam phased array antenna is an ideal solution to the ever-changing beam coverage requirements. Such a satellite should be capable of reconfiguring the location of the beams, the size of the beams, and the power radiated in each beam.

DISCLOSURE OF INVENTION

Accordingly, it is an object of the present invention to provide a multibeam satellite having reconfigurable beam coverages, beam power, and frequency channels along with dynamic frequency channel assignment.

It is a further object of the present invention to provide a multibeam satellite having a reconfigurable communications payload which can route any channel from any input beam to any channel of any output beam and which can reconfigure the number of channels, the channel bandwidths, the channel center frequencies and guard-bands, and the channel filter shapes.

It is a further object of the present invention to provide a multibeam satellite having a reconfigurable communications payload which can route any channel from any input beam and then cross-band to any channel of any output beam of different payloads and frequency bands.

It is a further object of the present invention to provide a multibeam satellite having a reconfigurable communications payload which can route any channel from any input beam and then Inter-Satellite link (ISL) to any channel of any output beam of a different satellite.

It is a further object of the present invention to provide a multibeam satellite having the capability for dynamic reconfiguration of the gain contour within each beam, allowing for increased efficiency in allocating satellite power to compensate for changing rain attenuation effects.

In carrying out the above objects and other objects, the present invention provides a satellite subsystem employing a reconfigurable communications payload and phased array antennas to accomplish a reconfigurable satellite regardless of geographical location. The satellite subsystem provides universal antenna pattern shaping capability along with an ultra flexible channel switching for desired signal path, filters, and bandwidth.

The satellite subsystem includes a receive antenna having a reconfigurable beam forming network for forming input beam signals from input signals received by the receive antenna from sources. An input switch matrix power divides the input beam signals into sets of input beam signals. The satellite subsystem further includes a channelizer having a plurality of channel processors each receiving at least one input beam signal from the input switch matrix. The channel processors filter the input beam signals into channel signals. Each of the channel signals corresponds to a respective channel of the input beam signals. The channel processors change the frequency of a channel signal to route the channel signal to a different channel than the respective channel of the input beam signals. An output switch matrix combines the channel signals into output beam signals. Each of the channel signals corresponds to a respective channel of the output beam signals. A transmit antenna having a reconfigurable beam forming network forms output signals from the output beam signals for transmission by the transmit antenna to destinations.

In accordance with the subsystem of the present invention, a method of routing a channel of an input beam signal to a channel of an output beam signal is also provided.

The advantages of the present invention are numerous. The satellite subsystem provides for the in-orbit reconfigurability of all parameters associated with conventional transponder satellite design, namely: variable frequency plan (number of channels, channel bandwidth, center frequency, filter shape, and channel gain/loading), variable beam coverage shape and antenna gain, variable transmit power per downlink beam coverage, and the addition of on-board switching/routing of individual channels between multiple uplink, downlink, and crosslink (ISL) beams. The satellite subsystem is flexible to adapt in orbit to support a wide range of geographical locations or business applications.

These and other features, aspects, and embodiments of the present invention are described in more detail in the following description, appended claims, and accompanying drawings.

BEST MODE FOR CARRYING OUT THE INVENTION

Figure 1:
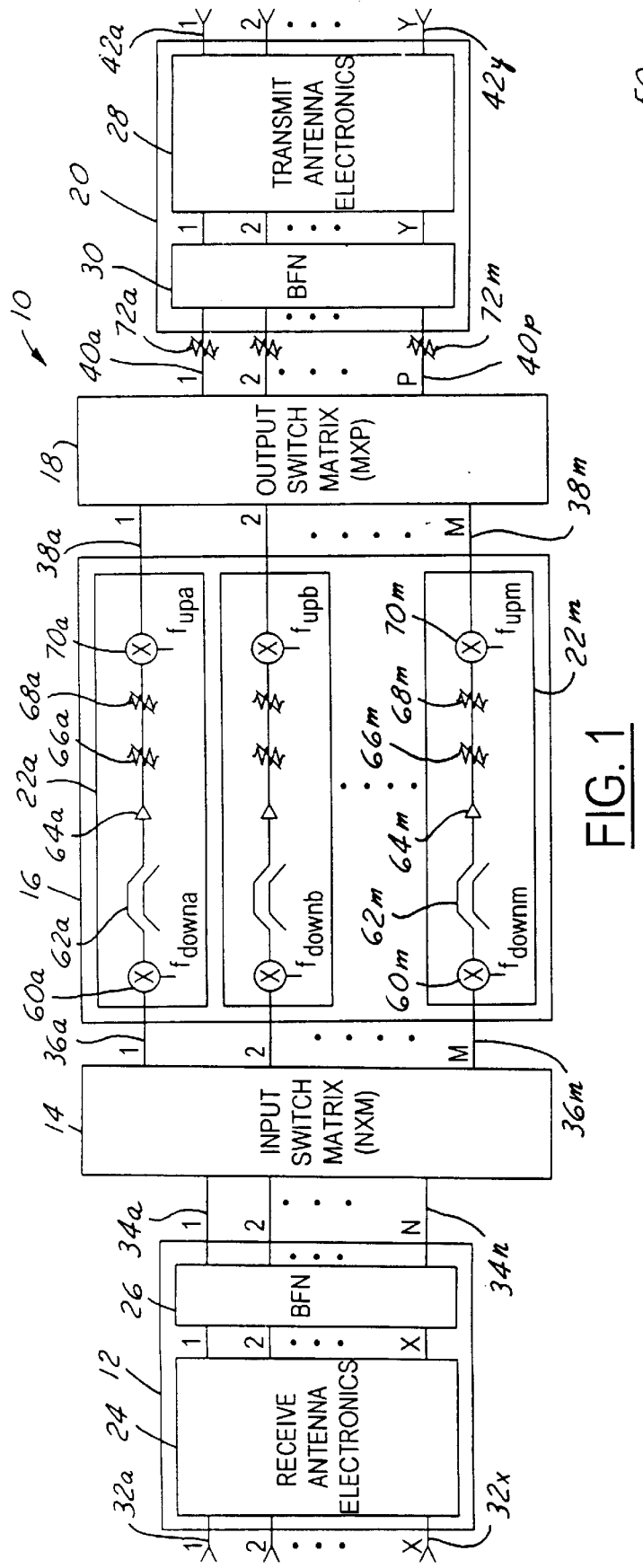
FIG. 1 illustrates a general block diagram of a satellite subsystem in accordance with the present invention.

Referring now to FIG. 1, a satellite subsystem 10 for a satellite in accordance with the present invention is shown. Satellite subsystem 10 includes a receive antenna 12, an input switch matrix 14, a channelizer 16, an output switch matrix 18, and a transmit antenna 20. The combination of input switch matrix 14, channelizer 16, and output switch matrix 18 is referred to as the reconfigurable communications payload of satellite subsystem 10.

In operation, receive antenna 12 receives input signals from sources to form input beam signals. Each input beam signal includes frequency separated channels. Input switch matrix 14 power divides the input beam signals into sets of input beam signals and selectively routes the input beam signals to channelizer 16. Channelizer 16 filters the input beam signals into channel signals. Channelizer 16 then changes the frequency of selected channel signals to route them to selected channels of selected output beam signals. Channelizer 16 also processes the input beam signals to reconfigure the bandwidth, the center frequency, the guard-bands, the filter shape, and the gain loading of each channel signal. Output switch matrix 18 combines the channel signals into output beam signals. Transmit antenna 20 transmits the output beam signals to destinations. Subsystem 10 operates in a selected frequency band such as C-Band, X-Band, Ku-Band, Ka-Band, and V-Band.

Receive antenna 12 includes receive antenna electronics 24 for providing up to N input beam signals from the input signals received from sources. Receive antenna 12 also includes a beam forming network 26 for setting and changing the beam reception coverage of the sources. Input switch matrix 14 is an N×M switch matrix and can power divide N input beam signals into a set of M input beam signals. Channelizer 16 includes M channel processors 22(a–m). Channel processors 22(a–m) receive respective input beam signals from input switch matrix 14. Channel processors 22(a–m) process the input beam signals to provide channel signals to output switch matrix 18. Output switch matrix 18 is a M×P switch matrix and can combine M channel signals into P output beam signals. Output switch matrix 18 then provides the output beam signals to transmit antenna 20. Transmit antenna 20 includes transmit antenna electronics 28 for transmitting output signals to destinations. The output signals correspond to up to M output beam signals. Transmit antenna 20 also includes a beam forming network 30 for setting and changing the beam transmission coverage of the destinations.

Receive antenna electronics 24 is an active array antenna including radiating elements 32(a–x) and low noise amplifiers and radio frequency (RF) filters for receiving input signals. An active array antenna includes phase, true time delay, or any combination thereof. Receive antenna electronics 24 includes associated attenuators and phase shifters (not specifically shown) for processing the received input signals. Beam forming network 26 also includes associated attenuators and phase shifters (not specifically shown) and combines the received input signals to generate N input beam signals. Beam forming network 26 may include a Rotman lens arrangement (not specifically shown) representing a "true time delay" function to form spot beams in addition to the typical "phase delay" function employed for the shaped regional beams.

Input switch matrix 14 includes N input beam ports 34(a–n) for receiving the input beam signals from beam forming network 26. Input switch matrix 14 further includes M output channel ports 36(a–m) for selectively routing the input beam signals to respective channel processors 22(a–m) after power dividing the input beam signals. After processing, channel processors 22(a–m) provide the channel signals to M input channel ports 38(a–m) of output switch matrix 18. Output switch matrix 18 includes P output beam ports 40(a–p) for providing the output beam signals to beam forming network 30 after combining the channel signals into output beam signals.

Beam forming network 30 includes associated attenuators and phase shifters (not specifically shown) and combines the output beam signals into output signals for transmission by transmit antenna 20. Beam forming network 30 may include a Rotman lens arrangement for forming spot beam shapes of the output signals. Transmit antenna electronics 28 is also an active array antenna including orthogonal mode transducers (OMTs), RF filters, power amplifiers and radiating elements 42(a–y) for transmitting the output signals. Transmit antenna electronics 28 includes associated attenuators and phase shifters (not specifically shown) for processing the output signals. Transmit antenna 20 also provides a combination of both fixed beam shapes (i.e., beam shapes fixed prior to launch by antenna design) and reconfigurable beam shapes to the transponder payload.

Figure 2:
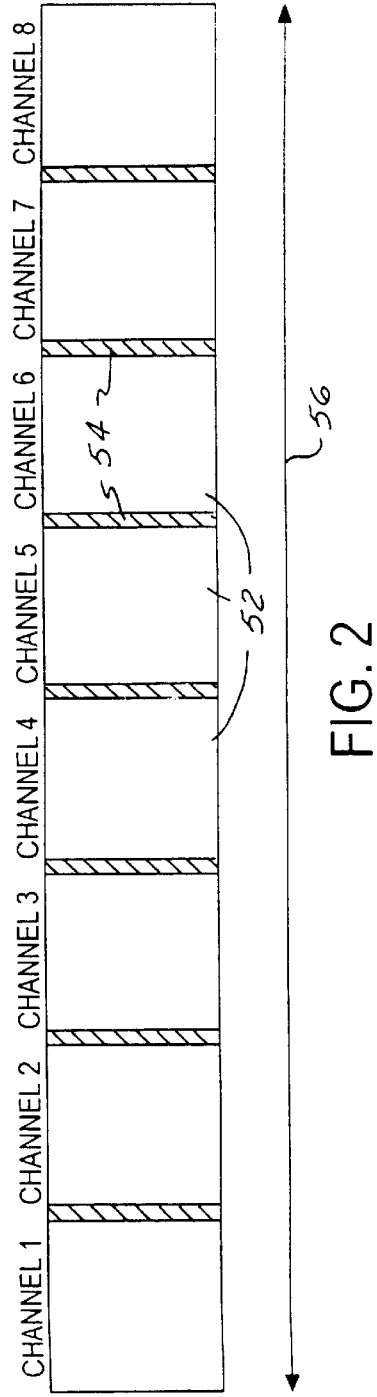
FIG. 2 illustrates the arrangement of an exemplary beam signal.

Referring now to FIG. 2 with continual reference to FIG. 1, an exemplary beam signal 50 includes, as an example, eight non-overlapping frequency separated channels 52 separated by guard-bands 54 within a frequency beam bandwidth 56. Frequency beam bandwidth 56 may be the same or different for each of the beam signals. The frequency band of the beam signals is at some regular communication frequency (e.g., C-Band, X-Band, Ku-Band, Ka-Band, or V-Band).

Input switch matrix 14 routes a desired input beam signal to a respective one of channel processors 22(a–m). The respective one of the channel processors 22(a–m) filters the input beam signal to transform it into channel signals. Each channel signal corresponds to a channel of the input beam signal. Each channel signal has a different frequency than the frequencies of the other channel signals corresponding to the other channels in the frequency beam bandwidth of the input beam signal.

Channel processors 22(a–m) include respective input mixers 60(a–m). Each input mixer 60(a–m) is connected to a frequency synthesizer (not specifically shown) to receive a respective local oscillator (LO) frequency signal $f_{down(a-m)}$. Channel processors 22(a–m) employ input mixers 60(a–m) for down converting the input beam signal from a high input frequency to an intermediate frequency prior to filtering the input beam signals into channel signals. The LO frequency signals $f_{down(a-m)}$ have selected frequencies such that the input beam signals within channel processors 22(a–m) have a common intermediate frequency (IF) after passing through input mixers 60(a–m).

Each of the channel processors 22(a–m) further includes a filter 62(a–m) connected to a respective one of input mixers 60(a–m). Filters 62(a–m) filter the frequency down converted input beam signals to pass channel signals having a selected channel bandwidth. Filters 62(a–m) are set to be at a common center frequency causing the channel signals in each of the channel processors 22(a–m) to have the same center frequency after passing through filters 62(a–m). Filters 62(a–m) control the channel bandwidth such that the channel bandwidth for each channel processor 22(a–m) is reconfigurable and may be independently selected.

Amplifiers 64(a–m) within channel processors 22(a–m) amplify the channel signals with a uniform gain. Amplifiers 64(a–m) provide the amplified channel signals to respective automatic gain controllers (AGC) 66(a–m). AGC 66(a–m) amplify the channel signals to automatically normalize the signal strength of each of the channel signals to a reference value. AGC 66(a–m) compensate for the input power variation among channel signals.

AGC 66(a–m) provide the amplified channel signals to respective manual gain controllers (MGC) 68(a–m). MGC 68(a–m) adjusts the channel signals to have a selected signal strength. MGC 68(a–m) allows the signal strength of each of the channel signals of channel processors 22(a–m) to be controlled independently.

MGC 68(a–m) provide the adjusted channel signals to respective output mixers 70(a–m). Each output mixer 70(a–m) is connected to the frequency synthesizer (not specifically shown) to receive a respective LO frequency signal $f_{up}(a-m)$. Channel processors 22(a–m) employ output mixers 70(a–m) for up converting the channel signal from the intermediate frequency to a high output frequency. The channel signals within channel processors 22(a–m) have high output frequencies after passing through output mixers 70(a–m). The LO frequency signals $f_{up}(a-m)$ have predetermined frequencies such that the channel signals correspond to selected channels of the output beam signal after passing through output mixers 70(a–m). Thus, the channel processors 22(a–m) change the frequency of the channel signals to route them to selected channels of selected output beam signals offering greater flexibility.

Output mixers 70(a–m) provide the channel signals to input channel ports 38(a–m) of output switch matrix 18. Output switch matrix 18 combines selected channel signals into output beam signals. Output switch matrix 18 outputs the output beam signals to output beam ports 40(a–p). MGC 72(a–m) adjust the output beam signals to select the gain provided to BFN 30 and transmit antenna electronics 28 between these signals. Transmit antenna 20 provides an acceptable linear gain for all input beam ports to the antenna output, and hence preserves the input power loading amongst transmit elements. The beam power is assigned to specific downlink beams and their coverages based on the individual beam requirements.

An on-board or ground controller controls the operation of receive antenna 12, input switch matrix 14, channelizer 16, output switch matrix 18, and transmit antenna 20. For instance, the controller controls input switch matrix 14 to select which channel processors 22(a–m) are to receive which input beam signals from the input switch matrix. The controller also determines which channel signals from the input beam signals are to be routed to selected channels of selected output beam signals. The controller also controls the frequencies of the LO frequency signals provided to input mixers 60(a–m) and output mixers 70(a–m). The controller further controls filters 62(a–m) to select the channel bandwidth and center frequencies of the channel signals. The controller further controls output switch matrix 18 to selectively combine the channel signals into output beam signals.

Figure 3:
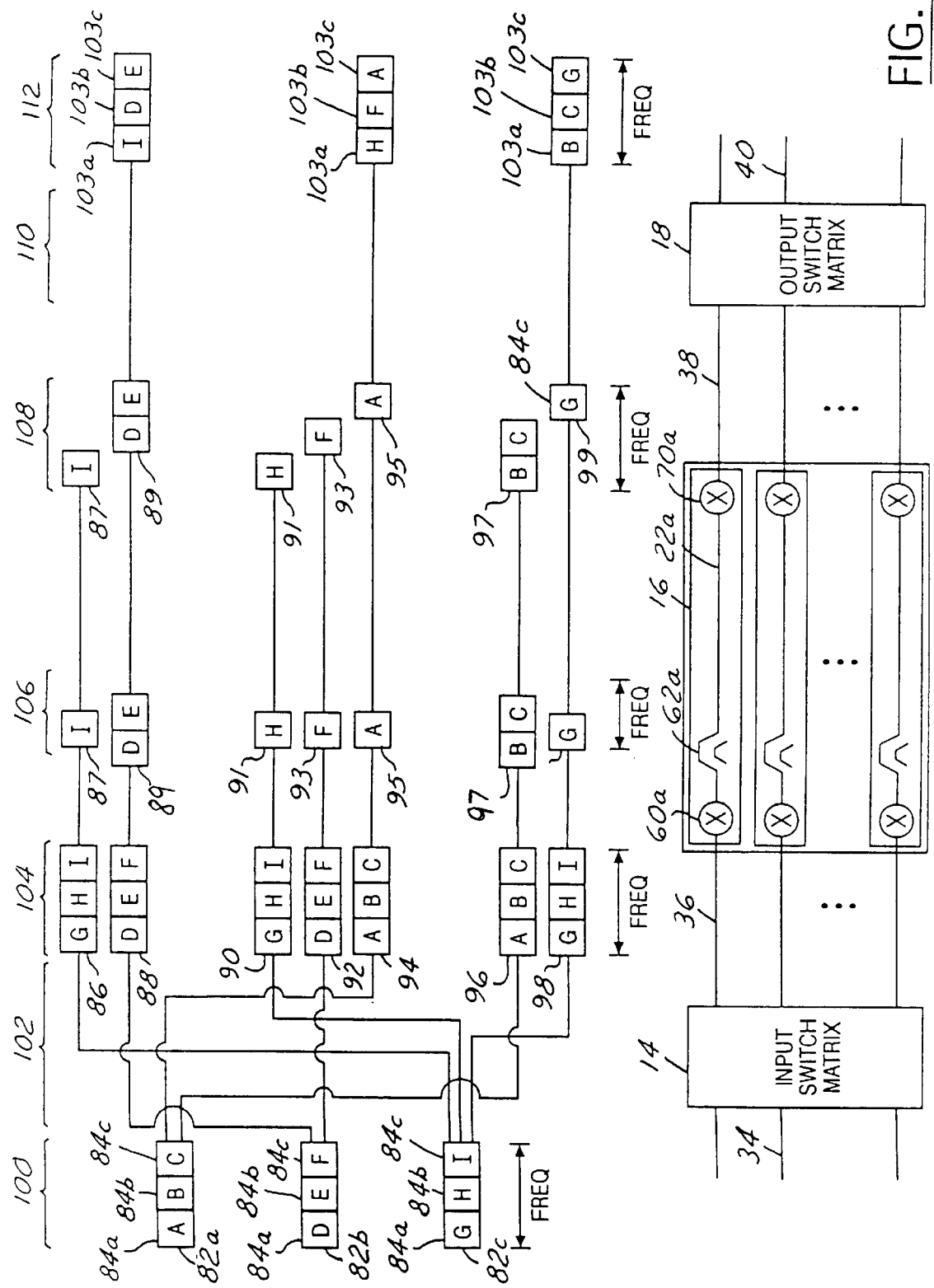
FIG. 3 illustrates an example of the processing operation of the switch matrices and the channelizer.

Referring now to FIG. 3 with continual reference to FIGS. 1 and 2, the operation of subsystem 10 will be described. FIG. 3 illustrates the processing of the channels of the input beam signals as these signals are routed by input switch matrix 14, filtered into channel signals and then frequency shifted by channelizer 16, and then combined into output beam signals by output switch matrix 18.

In operation, input switch matrix 14 receives three input beam signals 82(a–c) via respective input beam ports 34 as depicted by reference numeral 100. Each input beam signal 82(a–c) has three frequency separated channels 84(a–c) carrying channel signals. The input beam signals are shown as having the same frequencies. Of course, the frequencies of the input beam signals may be different. The channel signals are designated with capital letters, e.g., A, B, C, etc. to facilitate the description of the operation of the present invention.

Input switch matrix 14 power divides input beam signals 82(a–c) as depicted by reference numeral 102 into sets of input beam signals 86, 88, 90, 92, 94, 96, and 98. The input beam signals are provided to respective channel processors 22(a–m) of channelizer 16 via output channel ports 36 of input switch matrix 14 as depicted by reference numeral 104.

Each input beam signal provided to channel processors 22(a–m) is mixed with LO frequency signals in input mixers 60(a–m). The input beam signals are mixed to be down converted to a common intermediate frequency. Each of the LO frequency signals have different selected frequencies such that each input beam signal has a common intermediate frequency after passing through input mixers 60(a–m). Filters 62(a–m) then filter the frequency down converted input beam signals to pass channel signals 87, 89, 91, 93, 95, 97, and 99 having same center frequencies as depicted by reference numeral 106.

The channel signals are then mixed with other LO frequency signals in output mixers 70(a–m). The channel signals are mixed to be up converted. The channel signals are also mixed to change their frequencies such that the channel signals correspond to selected channels of the output beam signals after passing through output mixers 70(a–m) as depicted by reference numeral 108. To mix the channel signals to correspond to selected channels of the output beam signals, each of the LO frequency signals provided to output mixers 70(a–m) have different selected frequencies.

The LO frequency signals provided to output mixers 70(a–m) may be selected to cause the channel signals to correspond to different channels of the input beam signals after mixing. For instance, channel signal 99, which corresponded to channel 84a of input beam signal 82c, now corresponds in sequence (not frequency) to channel 84c. Thus, the LO frequency signal mixed with channel signal 99 is selected to boost the frequency of channel signal 99 to a relatively higher frequency channel. Similarly, channel signal 87, which corresponded to channel 84c of input beam 82c, now corresponds in sequence to channel 84a. The LO frequency signal mixed with channel signal 87 is selected to lower the frequency of channel signal 86 to a relatively lower frequency channel. The LO frequency signals may also be selected to cause the channel signals to correspond to the same channels after mixing in output mixers 70(a–m). Further, a channel signal of an input beam signal can be broadcasted to any number of channels of the output beam signals.

Output switch matrix 18 then receives the channel signals via respective input channel ports 38. Output switch matrix 18 combines the selected channel signals as depicted by reference numeral 110 into output beam signals 101(a–c). Each output beam signal 101(a–c) has three frequency separated channels 103(a–c) carrying channel signals. Output switch matrix 18 then outputs output beam signals 101(a–c) via output beam ports 40 as depicted by reference numeral 112.

FIG. 3 illustrates the general operation of input switch matrix 14, channelizer 16, and output switch matrix 18 for routing any channel of any input beam signal to any channel of any output beam signal. Thus, a channel from an uplink beam signal can be routed to a selected channel of a selected downlink beam signal. As described above, the channel signals can also be processed to have selected bandwidth, center frequencies, guard-bands, and different signal strengths.

In addition to routing channels between uplinks and downlinks in the same frequency band, subsystem 10 operating in one frequency band can be connected to another subsystem operating in another frequency band for cross routing of signals between frequency bands. The cross-routing would be cross-band of a channel of an input beam signal of one payload to a channel of an output beam signal of another payload. The cross routing would also be cross-link of a channel of an input beam signal of a satellite to a channel of an output beam signal of another satellite.

Figure 4:
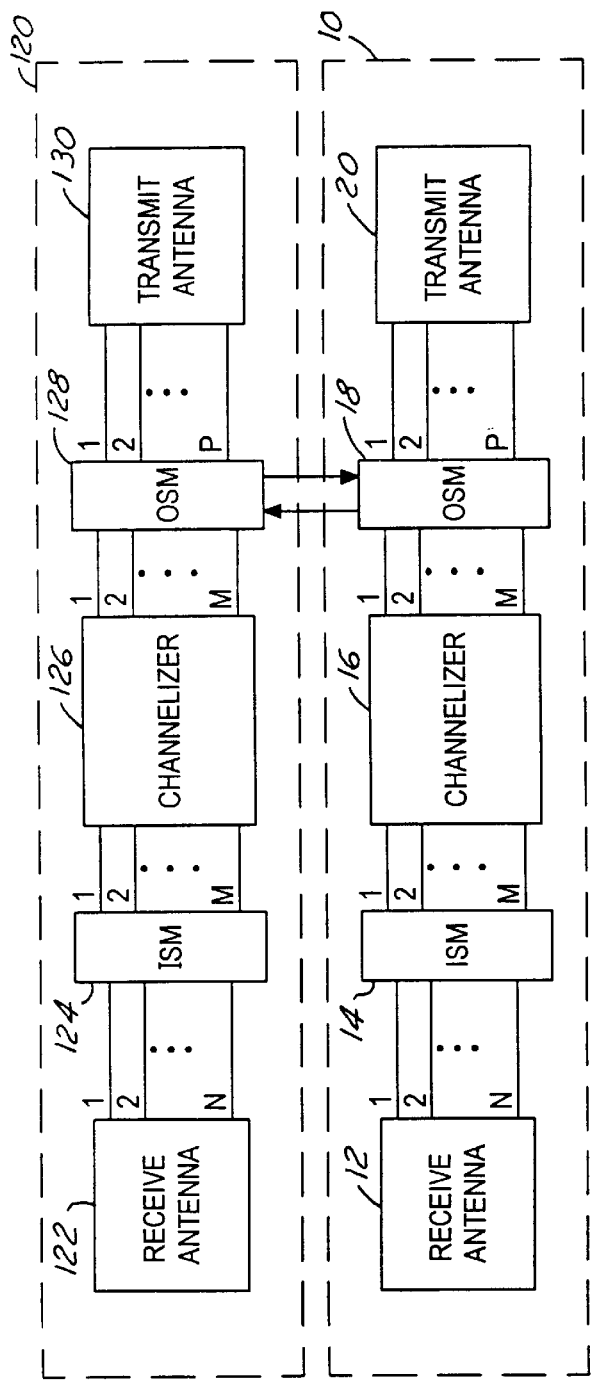
FIG. 4 illustrates a general block diagram of the satellite subsystem connected to another satellite subsystem for dual band operation.

Referring now to FIG. 4, subsystem 10 operating in a first frequency band is connected to another subsystem 120 operating in a second frequency band to achieve the inter-satellite link (ISL) concept. Typically, two or more subsystems are hosted on a given satellite to provide the required constellation connectivity. ISL service is available for any routable channel on the uplink, and crosslinked channels can be routed to any downlink beam.

Subsystem 120 includes the same structure as subsystem 10 such as receive antenna 122, input switch matrix 124, channelizer 126, output switch matrix 128, and transmit antenna 130. Although the devices between the subsystems are identical, they are labeled with different numbers to avoid confusion.

Output switch matrices 18 and 128 provide and receive channel signals from one another to route a channel of an input beam signal in one frequency band to a selected channel of a selected output beam signal in the other frequency band. Output switch matrix 128 receives the channel signals from output switch matrix 18 and then frequency converts the already processed channel signals to the final desired downlink frequency using output mixers and local oscillator signals (not specifically shown).

Thus, channel signals from an input beam signal having a frequency in the Ku-Band to output switch matrix 128 have the same intermediate frequency as channel signals from an input beam signal having a frequency in the C-Band provided to output switch matrix 128 from input switch matrix 18 after passing through the input mixers and filters of channelizer 126.

Accordingly, channels of input beam signals of one frequency band received from a source can be routed to selected channels of selected output beam signals of the same or different frequency bands to destinations. The sources and destinations may be earth stations or other satellites. Thus, two subsystems on respective satellites may be used for an intersatellite link between the satellites.

Figure 5:
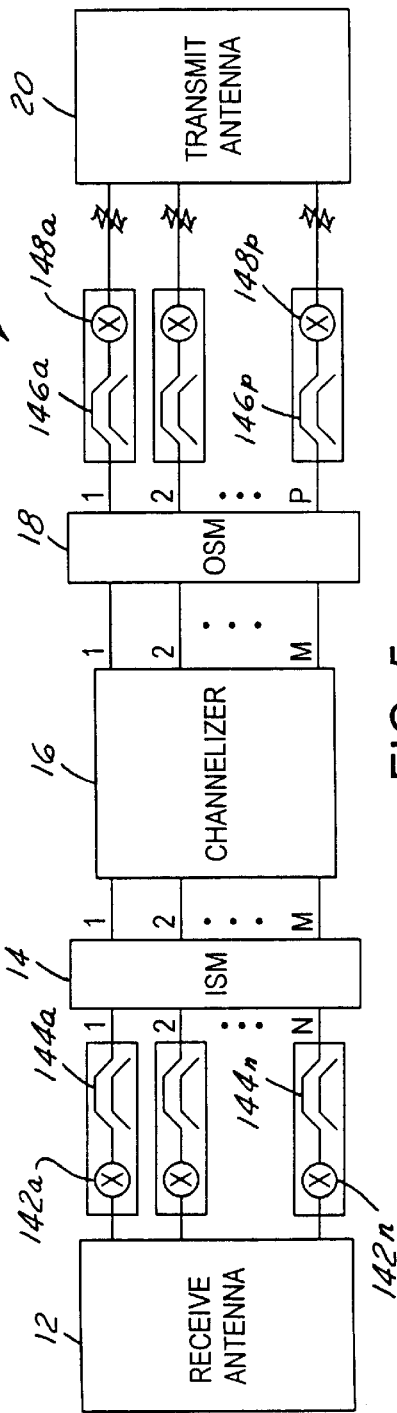
FIG. 5 illustrates an alternative embodiment of the satellite subsystem.

Referring now to FIG. 5, an alternative embodiment of the satellite subsystem which offers spur rejection for wide bandwidths is shown. Satellite subsystem 140 is identical to subsystem 10 but includes ISM input mixers 142(a–n), ISM output filters 144(a–m), OSM output filters 146(a–p), and OSM output mixers 148(a–p). Filters 144(a–m) and 146(a–p) are used for spur rejection filtering. Mixers 142(a–m) mix input beam signals from receive antenna 12 with LO frequency signals (not specifically shown) to convert the frequencies of the input beam signals to frequencies usable by ISM 14, channelizer 16, and OSM 18. Mixers 148(a–p) mix output beam signals from OSM 18 with LO frequency signals (not specifically shown) to convert the frequencies of the output beam signals to frequencies usable by transmit antenna 20.

Thus it is apparent that there has been provided, in accordance with the present invention, a satellite subsystem that fully satisfies the objects, the aims, and the advantages set forth above.

The satellite subsystem may be employed in one or more satellites located in geosynchronous orbit of a satellite communications system to accomplish universal coverage for the entire area of earth viewed by a given satellite. Typically, the satellite subsystem will operate within a fixed frequency band allocation on uplink and downlink. The satellites provide a transparent repeater function which connects frequency channels between uplink and (final) downlink beams without any specific demodulation, remodulation, or processing. The uplink and downlink beam coverages are variable and implemented using active beam-forming antennas. The uplink and downlink capacity assigned to each beam is independently variable up to the maximum spectrum allocated to the satellite.

Routing of channels between uplink, downlink, and crosslink beams is fully programmable via a combination of on-board and ground commanding. Download transmitter power for each beam coverage is variable from a pool of total satellite transmitter power and is implemented in the reconfigurable satellite transmit antenna. Intersatellite links are accommodated with a fixed maximum capacity which is dynamically allocated for traffic requiring source/destination pairs under two different satellite footprints.

In essence, the satellite system employing satellites having the subsystems of the present invention can achieve full global interconnectivity via on-board routing and crosslinks between satellites.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A satellite subsystem comprising:
   an active receive antenna including a reconfigurable beam forming network for forming input beam signals from input signals received by the receive antenna from sources;
   an input switch matrix for power dividing the input beam signals into sets of input beam signals;
   a channelizer having a plurality of channel processors each receiving at least one input beam signal from the input switch matrix, wherein the channel processors filter the input beam signals into variable channel signals, wherein each of the variable channel signals corresponds to a respective channel of the input beam signals, wherein the channel processors change the frequency of at least one variable channel signal to route the at least one variable channel signal to a different channel than the respective channel of the input beam signals;

an output switch matrix for combining the variable channel signals into variable output beam signals, wherein each of the variable channel signals corresponds to a respective channel of the variable output beam signals; and an active phased array transmit antenna including a reconfigurable beam forming network for forming output signals from the variable output beam signals for transmission by the transmit antenna to variable destinations.

2. The subsystem of claim 1 wherein:

each of the plurality of channel processors includes a first mixer for changing the frequency of the input beam signals to a common frequency prior to filtering the input beam signals into variable channel signals and a second mixer for changing the frequency of at least one variable channel signal from the common frequency to route the at least one variable channel signal to a different channel than the respective channel of the input beam signals.

3. The subsystem of claim 2 wherein:

each of the channel processors includes a filter for setting the bandwidth of the variable channel signals.

4. The subsystem of claim 1 wherein:

each of the channel processors includes an automatic gain controller for normalizing signal strength of each of the variable channel signals to a reference value.

5. The subsystem of claim 1 wherein:

each of the channel processors includes a manual gain controller for setting signal strength of each of the variable channel signals to a desired level.

6. The subsystem of claim 1 further comprising:

manual gain controllers connected to the output switch matrix for setting signal strength of each of the variable output beams signals to a desired level.

7. A satellite comprising:

a first satellite subsystem for routing a channel of an up link beam signal to a selected channel of a down link beam signal in a first frequency band, the subsystem including:

an active receive antenna having a reconfigurable beam forming network for forming up link beam signals from up link signals received by the receive antenna from sources, an input switch matrix for power dividing the input beam signals into sets of input beam signals, a channelizer including a plurality of channel processors each receiving at least one input beam signal from the input switch matrix, wherein the channel processors filter the input beam signals into variable channel signals, wherein each of the variable channel signals corresponds to a respective channel of the up link beam signals, wherein the channel processors change the frequency of at least one variable channel signal to route the at least one variable channel signal to a different channel than the respective channel of the up link beam signals, an output switch matrix for combining the variable channel signals into down link beam signals, wherein each of the variable channel signals corresponds to a respective channel of the down link beam signals, and an active transmit antenna including a reconfigurable beam forming network for forming down link signals from the variable output beam signals for transmission by the transmit antenna to variable destinations.

8. The satellite of claim 7 further comprising:

a second satellite subsystem operable with the first satellite subsystem to route a channel of an up link beam signal in the first frequency band to a selected channel of a down link beam signal in a second frequency band.

9. For use in a satellite, a method of routing a channel of an input beam signal to a channel of an variable output beam signal, the method comprising:

forming input beam signals from input signals received by a receive antenna from sources;

dividing the input beam signals into sets of input beam signals;

filtering the input beam signals into variable channel signals, wherein each of the variable channel signals corresponds to a respective channel of the input beam signals;

changing the frequency of at least one variable channel signal to route the at least one variable channel signal to a different channel than the respective channel of the input beam signals;

combining the variable channel signals into variable output beam signals, wherein each of the variable channel signals corresponds to a respective channel of the variable output beam signals; and forming output signals from the variable output beam signals for transmission by transmit antenna to variable destinations.

10. The method of claim 9 wherein:

changing the frequency of at least one the variable channel signal includes changing the frequency of the input beam signals to a common frequency prior to filtering the input beam signals into variable channel signals and then changing the frequency of at least one variable channel signal from the common frequency to route the at least one variable channel signal to a different channel than the respective channel of the input beam signals.

11. The method of claim 10 wherein:

setting the bandwidth of the variable channel signals.

12. The method of claim 9 wherein:

normalizing signal strength of each of the variable channel signals to a reference value.

13. The method of claim 9 wherein:

setting signal strength of each of the variable channel signals to a desired level.

14. The method of claim 9 further comprising:

setting signal strength of the variable output beam signals to a desired level.

15. The method of claim 9 wherein:

the sources of the input signals include other satellites.

16. The method of claim 9 wherein:

the variable destinations of the output signals include other satellites.

* * * * *